UNITED STATES PATENT OFFICE.

MAGGIE E. MINNICK, OF GALVESTON, TEXAS.

WASHING-FLUID.

SPECIFICATION forming part of Letters Patent No. 359,090, dated March 8, 1887.

Application filed September 13, 1886. Serial No. 213,404. (No specimens.)

*To all whom it may concern:*

Be it known that I, MAGGIE E. MINNICK, a citizen of the United States, residing at Galveston, in the county of Galveston and State of Texas, have invented certain new and useful Improvements in Detergents; and I do declare the following to be a full, clear, and exact description of the invention, such as will enable others skilled in the art to which it appertains to make and use the same.

This invention has relation to an improved detergent; and it consists in combining certain ingredients in the manner and proportions as will be hereinafter more fully set forth, and particularly pointed out in the claim appended.

In carrying out my invention I take one pound of borax, one quart of hot water, one-half pint of ammonia, one-half bar of soap, and one gallon of eupion-oil. I first place the borax in a vessel and pour the hot water into it and let stand until cool. I then add the oil, soap, and ammonia and mix the whole together, after which it can be bottled, when the preparation is ready for use. In use it will be found that two table-spoonfuls will be sufficient to every bucket of water.

I am aware that detergents or washing compounds have been produced containing soap dissolved in water, borax, and ammonia, in combination with other elements; but in no instance am I aware that the fluid known chemically and in the trade as "eupion-oil" has ever been incorporated with other elements to produce a detergent.

Having described this invention, what I claim is—

A washing-fluid consisting of borax, soap, ammonia, and eupion-oil, substantially as described.

In testimony whereof I affix my signature in presence of two witnesses.

MAGGIE E. MINNICK.

Witnesses:
SEABROOK W. SYDNOR,
C. C. ALLEN.